Figure 1:
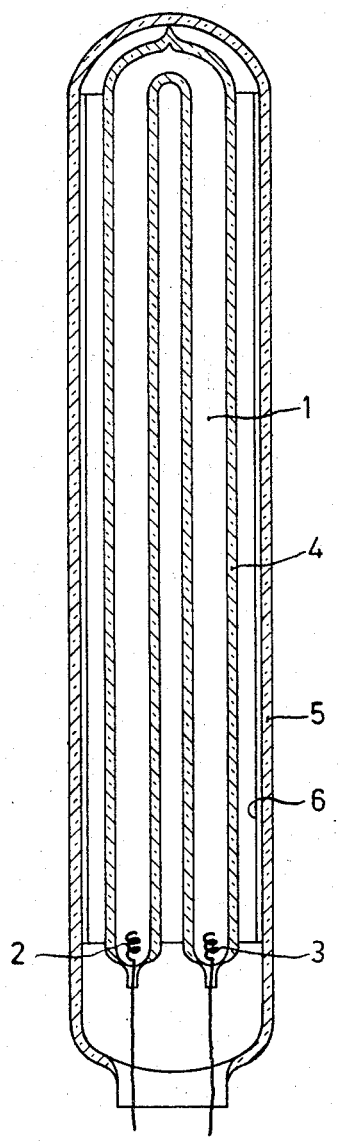

United States Patent

[11] 3,555,336

[72] Inventors Mijndert Koedam;
Willem Lambertus Wanmaker,
Emmasingel, Eindhoven, Netherlands
[21] Appl. No. 756,933
[22] Filed Sept. 3, 1968
[45] Patented Jan. 12, 1971
[73] Assignee U. S. Philips Corporation,
New York, N.Y.
a corporation of Delaware, by mesne assignments
[32] Priority Sept. 2, 1967
[33] Netherlands
[31] No. 6712085

[54] CADMIUM VAPOR DISCHARGE LAMP CONTAINING A EUROPIUM ACTIVATED PHOSPHOR
10 Claims, 2 Drawing Figs.

[52] U.S. Cl. .................................................. 313/109,
313/112, 313/225
[51] Int. Cl. .................................................. H01j 1/62,
H01j 63/04
[50] Field of Search ........................................ 313/109,
223, 225, 227, 228, 108, 92PH, 112; 252/301.4P

[56] References Cited
UNITED STATES PATENTS
| | | | |
|---|---|---|---|
| 2,152,999 | 4/1939 | Milner .......................... | 313/225 |
| 3,250,722 | 5/1966 | Borchardt .................... | 252/301.5 |
| 3,360,673 | 12/1967 | Vanderpool et al. ......... | 313/109X |

Primary Examiner—John Kominski
Assistant Examiner—David O'Reilly
Attorney—Frank R. Trifari ABSTRACT: A cadmium vapor discharge lamp containing a bivalent europium activated luminescent substance.

CADMIUM VAPOR DISCHARGE LAMP CONTAINING A EUROPIUM ACTIVATED PHOSPHOR

For many purposes radiation sources are employed which comprise the combination of a gas discharge tube and a luminescent screen containing one or more substances adapted to be excited by the radiation produced in the gas discharge and to emit radiation of higher wavelength as a result thereof. The luminescent substances may be located inside or outside the discharge space. It is generally known to use a combination of a low-pressure mercury vapor discharge tube and a luminescent screen which converts a large portion of the ultraviolet radiation produced in the mercury-vapor discharge into visible radiation. The luminescent substances are formed by highly different compounds. These compounds usually consist of crystal lattices containing one or more activators. The invention also relates to a radiation consisting of the combination of a gas discharge tube and a luminescent screen. However, in contrast to the aforesaid known radiation sources, the gas discharge tube contains cadmium vapor instead of mercury vapor.

The use of cadmium vapor in a discharge lamp is known. However, this lamp has not yet been employed in practice, since it has not been known which luminescent substances satisfy the most important specific requirements applying to the combination of these substances with a cadmium-vapor discharge, that is to say an appropriate excitation spectrum and a practically useful quantum efficiency.

In the known radiation sources consisting of the combination of a low-pressure mercury-vapor discharge tube and a luminescent screen the same considerations are, of course, due with respect to an appropriate excitation spectrum and a satisfactory quantum efficiency. As stated above, quite different compounds are known to form luminescent material suitable for being combined with a mercury-vapor discharge tube and it applies to said compounds that they satisfy the above-mentioned requirements to a greater or lesser extent. These substances are excited for an important part by the mercury spectrum lines of a wavelength of 185.0 and 253.7 nm. The spectrum of a cadmium-vapor discharge, which is very much similar to the spectrum of a mercury-vapor discharge, exhibits the corresponding spectrum lines at higher wavelengths, that is to say: 228.8 and 326.1 nm. From this difference it will be seen that substances suitable for being combined with a low-pressure mercury-vapor discharge need not be suitable for the combination with a low-pressure cadmium-vapor discharge. Very little is stated in literature on this subject.

The use of the combination of a low-pressure cadmium-vapor discharge and an appropriate luminescent substance has, for purely theoretical reasons, the advantage that the energy efficiency of the combination may be higher than that of the combination of a low-pressure mercury-vapor discharge and an appropriate luminescent substance, exactly because the exciting radiation of the cadmium-vapor spectrum has higher wavelengths. It is then supposed as a matter of course, for the quantum efficiency of the luminescent materials employed to have the same value.

A radiation source according to the invention comprises a low-pressure cadmium-vapor discharge tube and is characterized in that it comprises a luminescent screen containing a substance activated by bivalent europium, which converts at least part of the radiation emitted by the discharge in the cadmium vapor into radiation of higher wavelength.

The invention is based on elaborate investigations made both with known luminescent substances activated by bivalent europium and luminescent substances hitherto not described and activated by bivalent europium. It appears that all these substances have an excitation spectrum which satisfactorily matches the emission spectrum of a low-pressure cadmium-vapor discharge. Although the conversation efficiency of various luminescent substances activated by bivalent europium may be different, it has been found to be possible to manufacture practically usable radiation sources according to the invention by means of many of these substances. A few particularly suitable combinations will be described in detail hereinafter.

It is known that in a low-pressure mercury-vapor discharge tube, at a vapor pressure of about 10 $\mu$, the highest energy efficiency of the conversation of the electric energy supplied to the discharge tube into radiation of a wavelength of 185.0 and 253.7 nm. respectively is obtained. This optimum vapor pressure is obtained at a temperature of the discharge tube of about 40° C. Since this temperature does not deviate too much from normal room temperature, the use of low-pressure mercury-vapor discharge tubes has met with the known boom.

The optimum cadmium-vapor pressure in a low-pressure cadmium-vapor discharge tube is also about 10 $\mu$. This optimum vapor pressure is obtained at a temperature of the discharge tube of about 270° C. For the practical use in a radiation source it is therefore necessary, if a high energy efficiency of the conversion of the electric energy fed to the discharge tube into radiation of wavelengths of 228.8 and 326.1 nm., respectively is desired, to take steps to attain and maintain this wall temperature, inter alia by restricting the thermal losses. The situation is therefore similar to that of the known sodium vapor discharge lamps and the precautions taken with these lamps for restricting thermal losses may also be applied to a low-pressure cadmium-vapor discharge tube. It is therefore preferred to surround a low-pressure cadmium-vapor discharge tube for use in a radiation source according to the invention by an outer bulb which restricts the loss of heat of the discharge tube to the ambience. The space between the low-pressure cadmium-vapor discharge tube and the outer bulb is preferably exhausted so that the loss of heat is very slight. As with the sodium vapor discharge lamp the loss of heat may be further reduced by applying a layer of high infrared reflective power to the inner side of the outer bulb. This layer has, of course, to be transparent to the radiation to be emitted by the source. Suitable material for such a layer is, for example, conductive tin oxide, or conductive indium oxide. Also thin gold layers provide satisfactory results.

The luminescent material employed in a radiation source according to the invention may be provided at different places with respect to the cadmium-vapor discharge. The simplest method consists in the application to the inner side of the wall of the cadmium-vapor discharge tube. This application has the advantage that this wall need not be pervious to the short-wave ultraviolet radiation produced by the cadmium discharge. A disadvantage is, however, that the luminescent substance has to be resistant to the chemical attack by cadmium. The situation is different from that of a low-pressure mercury-vapor discharge lamp, since as stated above the temperature of the discharge tube has to exhibit the aforesaid high value in order to attain a high energy efficiency. If at this temperature the luminescent substance cannot withstand the discharge, operational conditions of the discharge tube have to be accepted, in which the temperature is lower and hence the efficiency is smaller. Apart from the chemical resistance the luminescent substance has to emit sufficient radiation of long wavelength at the temperature required for a high efficiency. With most luminescent substances the quantity of emitted radiation diminishes, as is known, fairly strongly at temperatures exceeding 100° C. The substances activated by bivalent europium employable in a radiation source according to the invention are such with respect to chemical resistance and temperature-dependence of the conversion that they can be applied to the inner side of the wall of the discharge space.

If the low-pressure cadmium-vapor discharge tube is surrounded for the aforesaid reasons by an outer bulb, the luminescent substance may also be applied to the outer side of the cadmium-vapor discharge tube or to the inner side of the outer bulb. To these two places it applies that the wall of the cadmium-vapor discharge tube has to be satisfactorily pervious to the short-wave ultraviolet radiation and has to be made, for example, of quarts. If the luminescent substance is applied to the outer side of the cadmium-vapor discharge tube, the aforesaid requirement applies that also at the high temperature the substance should be sufficiently emissive. The chemical resistance to the hot cadmium vapor does no longer play any part.

Since the inner side of the outer bulb has a much lower temperature than the wall of the cadmium-vapor discharge tube, it is more advantageous to apply the luminescent substance to said side. If it is desired, as stated above, to restrict the loss of heat by applying a heat-reflecting layer to the inner side of the outer bulb, the adhesion of the luminescent substance to this outer bulb already covered by the heat-reflective layer may sometimes give rise to difficulties. In accordance with the respective requirements, the nature of the luminescent substance and the manufacturing process one of the above-mentioned three places for the luminescent substance will be preferred.

A further possibility consists, of course, in applying the luminescent substance to the outer side of the outer bulb or to a separate reflector. In this case the outer bulb has to be made of a material which is satisfactorily pervious to short-wave ultraviolet radiation.

Which luminescent substance or which mixture of substances is employed in a radiation source according to the invention is dependent upon the intended use of the radiation source. If the radiation source is intended for use in apparatus for reproducing documents employing light-sensitive paper, a substance will be chosen which has a strong emission in the blue and/or long-wave ultraviolet part of the spectrum. An appropriate known substance is, for example, calcium fluoride activated by bivalent europium. It is described for this substance that when excited by ultraviolet radiation of a wavelength of 365.0 or 253.7 nm. from a mercury-vapor discharge it exhibits an emission having a maximum at about 420 nm. It has been found that the same emission also occurs upon excitation by the radiation from a low-pressure cadmium-vapor discharge.

A further known substance activated by bivalent europium is barium silicate of the basic lattice composition of $2BaO.1SiO_2$. This substance has a maximum emission at about 510 nm., both with an excitation by a radiation of a wavelength of 365.0 and 253.7 nm. respectively (which is known) cadmium-vapor with an excitation by a radiation from a low-pressure cadmium-vapor discharge. The last-mentioned substance may be used in a source of radiation according to the invention intended for illumination purposes.

Luminescent substances activated by bivalent europium which are not yet known will be described in detail hereinafter with reference to a few examples of manufacture. Some of these substances are particularly suitable for use in radiation sources intended for document-reproducing apparatus, others are more suitable for use in radiation sources for illumination purposes.

In a radiation source according to the invention there is preferably used a luminescent substance satisfying the formula:

$$xAO \cdot yBaO \cdot zMgO \cdot 1P_2O_5 : pEuO \cdot qMnO$$

wherein A designates at least one of the elements strontium and calcium and $1.90 \leq x+y+z+p+q \leq 2.05$ $0 \leq y \leq 1.2$ $0 \leq z \leq 1.6$ $y+z \leq 1.6$ $0.005 \leq p \leq 0.21$ $0 \leq q \leq 0.15$ $0.15 \leq x$.

The properties of these luminescent substances are substantially independent of the ratio between the elements designated by A. A may therefore be strontium or calcium or a mixture of these two elements.

The condition: 1.90 $x+y+z+p+q$ 2.05 indicates that the substance should approximately have the pyrophosphate composition. As is known, it is sometimes more advantageous to base the manufacture of a complex lattice with a plurality of elements on a mixture in which the quantities of the constituents do not completely satisfy the stoechiometric ratio in the pyrophosphate. A small excess quantity of one or more of the basic components often provides a higher yield of the formation reaction. The reaction product then contains a small excess quantity of one or more of the basic components. This reaction product satisfies the aforesaid condition of $x+y+z+p+q$, but the luminescent substance proper presumably satisfies accurately the stoechiometric formula of the pyrophosphate. Since it has been found that the residues of basic substances left usually have only a negligible influence on the luminescence, it is not always necessary to remove them.

The elements barium and magnesium, as will be evident from the conditions for $y$ and $z$, may be absent. The spectral distribution of the emission spectrum is practically not affected by the presence of barium; more than 1.2 molecules of barium produces, however, a reduction of the conversion efficiency of the ultraviolet radiation and is therefore undesirable.

The quantity of magnesium may be chosen larger, i.e. 1.6 molecules without the radiation conversion efficiency being reduced excessively. The use of a quantity of magnesium exceeding one-fourth of the quantity of calcium and strontium together gives rise to the production of an emission spectrum having two peaks, i.e. one at about 420 nm. and one at about 391 nm. The intensities of the emitted radiations at these two wavelengths are correlated so that with an increase of the quantity of magnesium the intensity of the peak at 391 nm. constantly increases and the intensity of the peak at 420 nm. constantly decreases until at a quantity of magnesium oxide of 1.2 mol. practically no radiation is any longer emitted at 420 nm. The radiation at 391 nm. is then, however, very strong.

The condition that $y+z$ should at the most be equal to 1.6 is required since otherwise when choosing the maximum quantity of magnesium and the maximum quantity of barium no calcium and/or strontium could be present in the luminescent substance. One of these two elements is, however, always required and the value of $x$ should be at least 0.15.

The quantity of bivalent europium oxide may be varied between the aforesaid limits, but it is preferable chosen between 0.01 and 0.04. In this region lies the highest radiation efficiency.

From the condition: $0 \leq q \leq 0.15$ it appears that the luminescent substance need not invariably contain manganese. If manganese is present, an emission is also obtained in the red part of the spectrum. By activating it by bivalent europium and manganese this substance has a strong emission in the blue part and in the red part of the spectrum. The radiation source is therefore suitable for illumination purposes, when a satisfactorily color rendition is wanted. The fact that the substances activated by bivalent europium and manganese emit only slightly in the green and yellow parts of the spectrum is of little importance since the cadmium discharge itself exhibits fairly strong emission lines in this very part. These emission lines lie at 467.8 nm., 480.0 nm. and 508.0 nm. At these wavelengths the luminescent substances satisfying the above-mentioned formula do practically not emit radiation. As compared with low-pressure mercury-vapor discharge lamps the combination of these substances with a low-pressure cadmium-vapor discharge lamp is considerably more favorable. The corresponding emission lines of the low-pressure mercury-vapor discharge spectrum lie partly in the very region in which also most luminescent substances employed emit a fairly strong radiation. Therefore more radiation may be emitted with these wavelengths than is desirable for a satisfactory color rendition.

This disadvantage is not involved in a radiation source according to the invention.

A luminescent substance particularly suitable for a combination with a low-pressure cadmium-vapor discharge tube to form a radiation source for illumination purposes satisfies the formulas:

$x$SrO·$z$MgO·1$P_2O_5$:$p$EuO·$q$MnO, wherein
$1.90 \leq x+z+p+q \leq 2.05$
$0.2 \leq z \leq 1.6$
$0.005 \leq p \leq 0.21$
$0.02 \leq q \leq 0.15$
$0.15 \leq x$.

Substances satisfying this formula and said conditions provide a high degree of efficiency in conjection with a satisfactory color rendition, particularly when $0.8 \leq z \leq 1.4$
$0.01 \leq p \leq 0.04$
$0.04 \leq q \leq 0.10$.

Apart from the above-mentioned advantages of the luminescent materials suitable for use in a radiation source according to the invention the substances have low sensitivity to oxidation. This is very important in the manufacture of the radiation source, since the substances are often exposed for a short time to heating in air at a fairly high temperature, for example 600° C. Such heating may be required, when an organic binder is used which has to be removed afterwards by heating.

The invention will now be described with reference to a drawing and to a few examples of manufacture of luminescent substances suitable for use in a radiation source according to the invention.

In the drawing FIG. 1 shows schematically an embodiment of a radiation source according to the invention.

Figure 2:
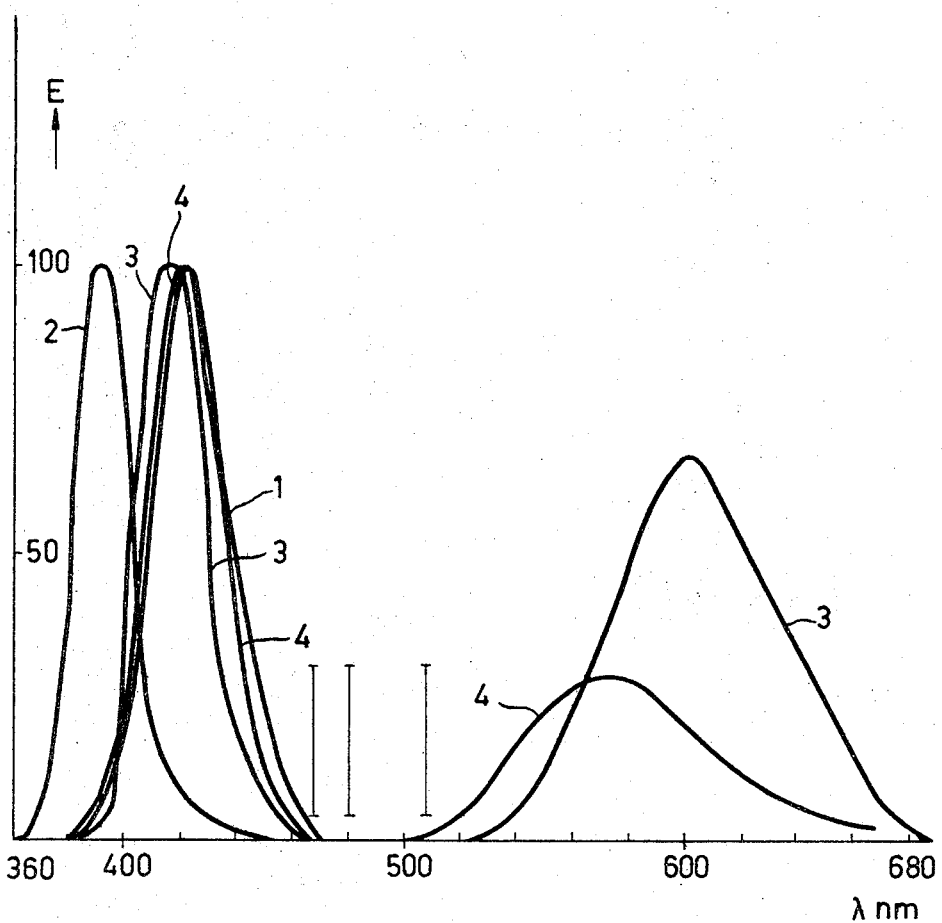

FIG. 2 of the drawing is a graph in which the intensity of the luminescent radiation is plotted in arbitrary units on the ordinate and the wavelength on the abscissa in manometers. The curves of the graph illustrate the variation of the intensity for the following examples. The maximum for each curve is fixed at 100.

Referring to FIG. 1, reference numeral 1 designates a low-pressure cadmium-vapor discharge tube having the form of a U. Two and three designate the cathodes. In the embodiment shown the wall 4 of this discharge tube is made of vitreous quartz. The discharge tube 1 is surrounded by an outer bulb 5, for example, of hard glass 6 designates a layer of luminescent material the layer 6 is applied to the innerside of the outer bulb 5 by coating said innerside with a suspension containing the luminescent material and an organic binder e.g. nitrocellulose the coated bulb is then dried, after which the organic binder is removed by heating the discharge tube 1 contains cadmium vapor and a rare gas or a rare-gas mixture for starting the discharge and for improving the output. Such a gas or gas mixture, for example, neon or neon plus a small supply of argon, is used as is known also in mercury-vapor discharge lamps and sodium lamps.

EXAMPLES OF PRODUCTION.—EXAMPLE 1

A mixture of
6.904 gs. of $SrHPO_4$,
0.317 g. of $(NH_4)_2HPO_4$,
0.070 g. of $Eu_2O_3$, is made and thoroughly mixed in a morser and put into a crucible. The crucible with its contents is then introduced into a furnace, in which it is heated at a temperature of 1,200° C. for two hours, while a stream of air is passed over. After heating the reaction product is refined in a morser and sieved through a sieve of 220μ mesh. The material passed through the sieve is again heated at a temperature of 1,200° C. for two hours in a furnace, through which air is passed. After cooling of the crucible with its contents to room temperature, the reaction product is ground to fineness and sieved. It is then ready for use.

The composition of the reaction produce satisfies the formula:

1.88SrO.1 $P_2O_5$:0.02 EuO.

Upon excitation by ultraviolet radiation from a low-pressure cadmium-vapor discharge the luminescent material emits a radiation whose spectral distribution is illustrated by curve 1 in FIG. 2 of the drawing.

Heating may be carried out in a neutral or slightly reducing atmosphere, for example, in a mixture of nitrogen and 0.1 to 8 percent by volume of hydrogen, instead of being carried out in air. This often provides a higher radiation output of the luminescent material. Presumably, this may be accounted for by a more complete conversation of the $Eu_2O_3$ into EuO. This conversion is obtained, however, also by heating in air. This may be accounted for by the fact that apparently the europium is preferably incorporated in the crystal lattice in the bivalent form, since the ion radii of strontium and bivalent europium are practically the same.

The reducing atmosphere may, if desired, also be obtained by placing in the furnace at the side of the crucible containing the mixture of crucible containing finely divided carbon and by passing over air or a different oxygen-containing gas. The oxygen and the carbon form carbon monoxide which constitutes the reducing atmosphere above the reaction mixture.

EXAMPLE 2

A mixture of
4.333 gs. of $SrHPO_4$,
2.177 gs. of $CaHPO_4$,
0.053 g. of $(NH_4)_2HPO_4$, and 0.070 g. of $Eu_2O_3$ is made and treated in the manner described in example 1.
The resultant luminescent material satisfies the formula:

1,18Sr0.0.80Ca0.1$P_2O_5$:0.02EuO.

Upon excitation by ultraviolet radiation from a low-pressure cadmium-vapor discharge the luminescent material emits a radiation whose spectral distribution is also illustrated by the curve 1 of FIG. 2 of the drawing.

EXAMPLE 3

A mixture of
5.388 gs. of $CaHPO_4$,
0.053 g. of $(NH_4)_2HPO_4$,
0.070 g. of $Eu_2O_3$ is made and treated completely in the same manner as described in example 1.
The resultant luminescent material satisfies the formula:

1.98Ca0.1$P_2O_5$:0.02EuO.

Upon excitation by ultraviolet radiation from a low-pressure cadmium-vapor discharge, the luminescent material emits a radiation whose spectral distribution is also illustrated by the curved 1 of FIG. 2 of the drawing.

EXAMPLE 4

A mixture of
5.802 gs. of $SrHPO_4$,
1.867 gs. of $BaHPO_4$,
0.053 g. of $(NH_4)_2HPO_4$,
0.070 g. of $Eu_2O_3$ is made and treated completely in the same manner as described in example 1.
The resultant luminescent material satisfies the formula:

1.58Sr0.0.40Ba0.1$P_2O_5$:0.02EuO.

Upon excitation by ultraviolet radiation from a low-pressure cadmium-vapor discharge the luminescent material emits a radiation whose spectral distribution is also illustrated by the curve 1 of

EXAMPLE 5

A mixture of
5.802 gs. of $SrHPO_4$,
1.099 gs. of $MgNH_4PO_4$,
0.053 g. of $(NH_4)_2HPO_4$,
0.070 g. of $Eu_2O_3$ is made and treated completely in the same manner as described in example 1.

The resultant luminescent material satisfies the formula:

1.58SrO.0.40MgO.1P$_2$O$_5$:0.02EuO.

Upon excitation by ultraviolet radiation from a low-pressure cadmium-vapor discharge the luminescent material emits a radiation whose spectral distribution is also illustrated by the curve 1 of FIG. 2 of the drawing.

EXAMPLE 6

A mixture of
6.427 gs. of SrHPO$_4$,
0.660 g. of (NH$_4$)$_2$HPO$_4$,
0.528 g. of Eu$_2$O$_3$ is made and treated completely in the same manner as described in example 1.

The resultant luminescent material satisfies the formula:

1.75SrO.1P$_2$O$_5$:0.15EuO.

Upon excitation by ultraviolet radiation from a low-pressure cadmium-vapor discharge the luminescent material emits a radiation whose spectral distribution is also illustrated by the curve 1 of FIG. 2 of the drawing.

EXAMPLE 7

A mixture of
5.068 gs. of SrHPO$_4$,
0.544 g. of CaHPO$_4$,
0.549 g. of MgNH$_4$PO$_4$,
0.933 g. of BaHPO$_4$,
0.053 g. of (NH$_4$)$_2$HPO$_4$,
0.070 g. of Eu$_2$O$_3$ is made and treated completely in the same manner as described in example 1.

The resultant luminescent material satisfies the formula:

1.38SrO.020C.O.0.20MgO.0.20BaO.1P$_2$O$_5$: 0.02EuO.

Upon excitation by ultraviolet radiation from a low-pressure cadmium-vapor discharge the luminescent material emits a radiation whose spectral distribution is also illustrated by the curve 1 of FIG. 2 of the drawing.

EXAMPLE 8

A mixture of
5.802 gs. of SrHPO$_4$,
0.933 g. of BaHPO$_4$,
0.544 g. of CaHPO$_4$,
0.053 g. of (NH$_4$)$_3$HPO$_4$,
0.070 g. of Eu$_2$O$_3$ is made and treated completely in the same manner as described in example 1.

The resultant luminescent material satisfies the formula:

1.58SrO.0.20BaO.0.20CaO.P$_2$O$_5$:0.02EuO.

Upon excitation by ultraviolet radiation from a low-pressure cadmium-vapor discharge the luminescent material emits a radiation whose spectral distribution is also illustrated by the curve 1 of FIG. 2 of the drawing.

EXAMPLE 9

A mixture of
2.864 gs. of SrHPO$_4$,
3.296 gs. of MgNH$_4$PO$_4$,
0.052 g. of (NH$_4$)$_2$HPO$_4$,
0.070 g. of Eu$_2$O$_3$ is made and treated completely in the same manner as described in example 1.

The resultant luminescent material satisfies the formula:

0.78SrO.1.20MgO.1P$_2$O$_5$:0.02EuO.

Upon excitation by ultraviolet radiation from a low-pressure cadmium-vapor discharge the luminescent material emits a radiation whose spectral distribution is illustrated by the curve 2 of FIG. 2 of the drawing.

EXAMPLE 10

A mixture of
5.116 gs. of CaHPO$_4$,
0.053 g. of (NH$_4$)$_2$HPO$_4$,
0.336 g. of MnNH$_4$PO$_4$,
0.070 g. of Eu$_2$O$_3$ is made and treated completely in the same manner as described in example 1.

The resultant luminescent material satisfies the formula:

1.88CaO.1P$_2$O$_5$:0.02EuO.0.10MnO.

Upon excitation by ultraviolet radiation from a low-pressure cadmium-vapor discharge the luminescent material emits a radiation whose spectral distribution is illustrated by the curve 3 in FIG. 2 of the drawing.

EXAMPLE 11

A mixture of
6.904 gs. of SrHPO$_4$,
0.053 g. of (NH$_4$)$_2$HPO$_4$,
0.336 g. of MnNH$_4$PO$_4$,
0.070 g. of Eu$_2$O$_3$ is made and treated completely in the same manner as described in example 1.

The resultant luminescent material satisfies the formula:

1.88SrO.1P$_2$O$_5$:0.02EuO.0.10MnO.

Upon excitation by ultraviolet radiation from a low-pressure cadmium-vapor discharge the luminescent material emits a radiation whose spectral distribution is illustrated by the curve 4 in FIG. 2 of the drawing.

In FIG. 2 of the drawing the vertical lines indicate the places of the maxima of the radiation in the visible part of the spectrum emanating from cadmium-vapor discharge itself. It is apparent that these maxima are located in the very valley of the curves 3 and 4.

We claim:

1. A cadmium-vapor discharge lamp comprising a glass envelope, cadmium vapor, a means to produce an electric discharge in said envelope and a bivalent europium activated phosphor positioned to receive radiation resulting from an electric discharge in said cadmium vapor said phosphor predominantly responsive to radiation at the wavelengths of 228.8 nm. and 326.1 nm.

2. The lamp of claim 1 wherein the phosphor is located on the inner side of the glass envelope.

3. The lamp of claim 1 wherein the glass envelope is surrounded by an outer bulb.

4. The lamp of claim 3 wherein the phosphor is located on the innerside of the outer bulb.

5. The lamp of claim 3 wherein the phosphor is located on the outer side of the glass envelope.

6. The lamp of claim 3 wherein the space between the glass enveloped and the outer bulb is exhausted.

7. The lamp of claim 3 wherein the inner side of the outer bulb is provided with a layer which strongly reflects infrared rays but is previous to visible or ultraviolet radiation.

8. The lamp of claim 1 wherein the phosphor satisfies the formula $x$AO.$y$BaO.$z$MgO.1P$_2$O$_5$:$p$EuO.$q$MnO, wherein A designates at least one of the elements strontium and calcium and $1.90 \leq x+y+z+p+q \leq 2.05$,
$0 \leq y \leq 1.2$,
$0 \leq z \leq 1.6$,
$y+z \leq 1.6$,
$0.005 \leq p \leq 0.21$,
$0 \leq q \leq 0.15$,
$0.15 \leq x$.

9. The lamp of claim 1 wherein the phosphor satisfies the formula $x\mathrm{SrO}.z\mathrm{MgO}.1\mathrm{P_2O_5}:p\mathrm{EuO}.q\mathrm{MnO}$, wherein
$1.90 \leq x+z+p+q \leq 2.05$,
$0.2 \leq z \leq 1.6$,
$0.005 \leq p \leq 0.21$,
$0.02 \leq q \leq 0.15$,
$0.15 \leq x$.

10. The lamp of claim 1 wherein the phosphor satisfies the formula $x\mathrm{SrO}.z\mathrm{MgO}.1\mathrm{P_2O_5}:p\mathrm{EuO}.q\mathrm{MnO}$, wherein
$1.90 \leq x+z+p+q \leq 2.05$,
$0.8 \leq z \leq 1.4$,
$0.01 \leq p \leq 0.04$,
$0.04 \leq q \leq 0.10$.

PO-1050
(5/69)

UNITED STATES PATENT OFFICE
CERTIFICATE OF CORRECTION

Patent No. __3,555,336 (PHN 2702)__ Dated _____January 12, 1971__

Inventor(s) __MIJNDERT KOEDAM ET AL__

It is certified that error appears in the above-identified patent and that said Letters Patent are hereby corrected as shown below:

Column 2, line 74, "quarts" should read -- quartz --.

Column 4, line 5, after "1.90" insert -- $\leqq$ --;

after "q" insert -- $\leqq$ --.

Column 5, line 38, "manometers" should read -- nanometer line 44, "Two and three" should read -- 2 and Column 8, line 56, "enveloped" should read -- envelope --

Signed and sealed this 30th day of November 1971.

(SEAL)
Attest:

EDWARD M. FLETCHER, JR.　　　　　　　　ROBERT GOTTSCHALK
Attesting Officer　　　　　　　　　　　　Acting Commissioner of Pat